US012560256B2

(12) United States Patent
Lepan

(10) Patent No.: US 12,560,256 B2
(45) Date of Patent: Feb. 24, 2026

(54) MODULAR REDUCTION GEARBOX

(71) Applicant: Bernard Controls, Gonesse (FR)

(72) Inventor: Rémy Lepan, Bruyères sur Oise (FR)

(73) Assignee: Bernard Controls, Gonesse (FR)

( * ) Notice: Subject to any disclaimer, the term of this patent is extended or adjusted under 35 U.S.C. 154(b) by 149 days.

(21) Appl. No.: 18/420,082

(22) Filed: Jan. 23, 2024

(65) Prior Publication Data

US 2024/0247732 A1 Jul. 25, 2024

(30) Foreign Application Priority Data

Jan. 24, 2023 (FR) ...................................... 2300660

(51) Int. Cl.
*F16K 31/04* (2006.01)
*F16K 31/53* (2006.01)

(52) U.S. Cl.
CPC ............ *F16K 31/047* (2013.01); *F16K 31/53* (2013.01)

(58) Field of Classification Search
CPC ........ F16K 31/047; F16K 31/53; F16K 31/05; F16K 31/043; F16D 11/10; F16D 11/14; F16H 1/20; F16H 1/28; F16H 1/36; F16H 1/32; F16H 2200/2007; F16H 57/023; F16H 2057/02034; H02K 7/003; H02K 7/116
See application file for complete search history.

(56) References Cited

U.S. PATENT DOCUMENTS

| | | | | |
|---|---|---|---|---|
| 4,616,528 A | * | 10/1986 | Malinski | F16K 31/05 |
| | | | | 475/263 |
| 4,669,578 A | * | 6/1987 | Fukamachi | F03G 1/08 |
| | | | | 251/71 |
| 4,896,562 A | * | 1/1990 | Wilkinson | G05G 11/00 |
| | | | | 475/3 |
| 5,588,637 A | * | 12/1996 | Carsten | F16K 31/05 |
| | | | | 251/129.13 |
| 8,342,478 B1 | * | 1/2013 | Cordray | F16K 37/0075 |
| | | | | 137/554 |
| 10,024,499 B2 | | 7/2018 | Ohashi | |
| 2006/0255303 A1 | * | 11/2006 | Denike | F16K 17/046 |
| | | | | 251/305 |
| 2012/0319019 A1 | * | 12/2012 | Burgess | F16K 31/53 |
| | | | | 251/250.5 |
| 2018/0298988 A1 | | 10/2018 | Hsu | |

OTHER PUBLICATIONS

INPI, Search Report and Written Opinion dated Jul. 21, 2023, issued in French patent application No. FR2300660, 9 pages.

* cited by examiner

*Primary Examiner* — Patrick C Williams
(74) *Attorney, Agent, or Firm* — Merchant & Gould P.C.

(57) ABSTRACT

A mechanical power transmission system for controlling a valve or a louver vent, a declutching mechanism of which comprises a driving part (59) and a driven part which together form a dog clutch on an axis, the driven part having a ring gear on a section axially opposite to the indentation of the dog clutch driven part cavity, and being coupled to the actuating mechanism by said ring gear and one or a plurality of stepped satellite gears meshing a toothed wheel of a sun gear (50) of the power transmission system coupled to the first input by a splined central bore, said sun gear (50) having, on a section axially opposite the toothed wheel thereof, an indentation of the driven part matching the driving part (59), and said driven part having a central splined bore matching said first input, the rod extending through the two central bores and pushing a hub of the driving part (59), in order to perform a declutching.

10 Claims, 13 Drawing Sheets

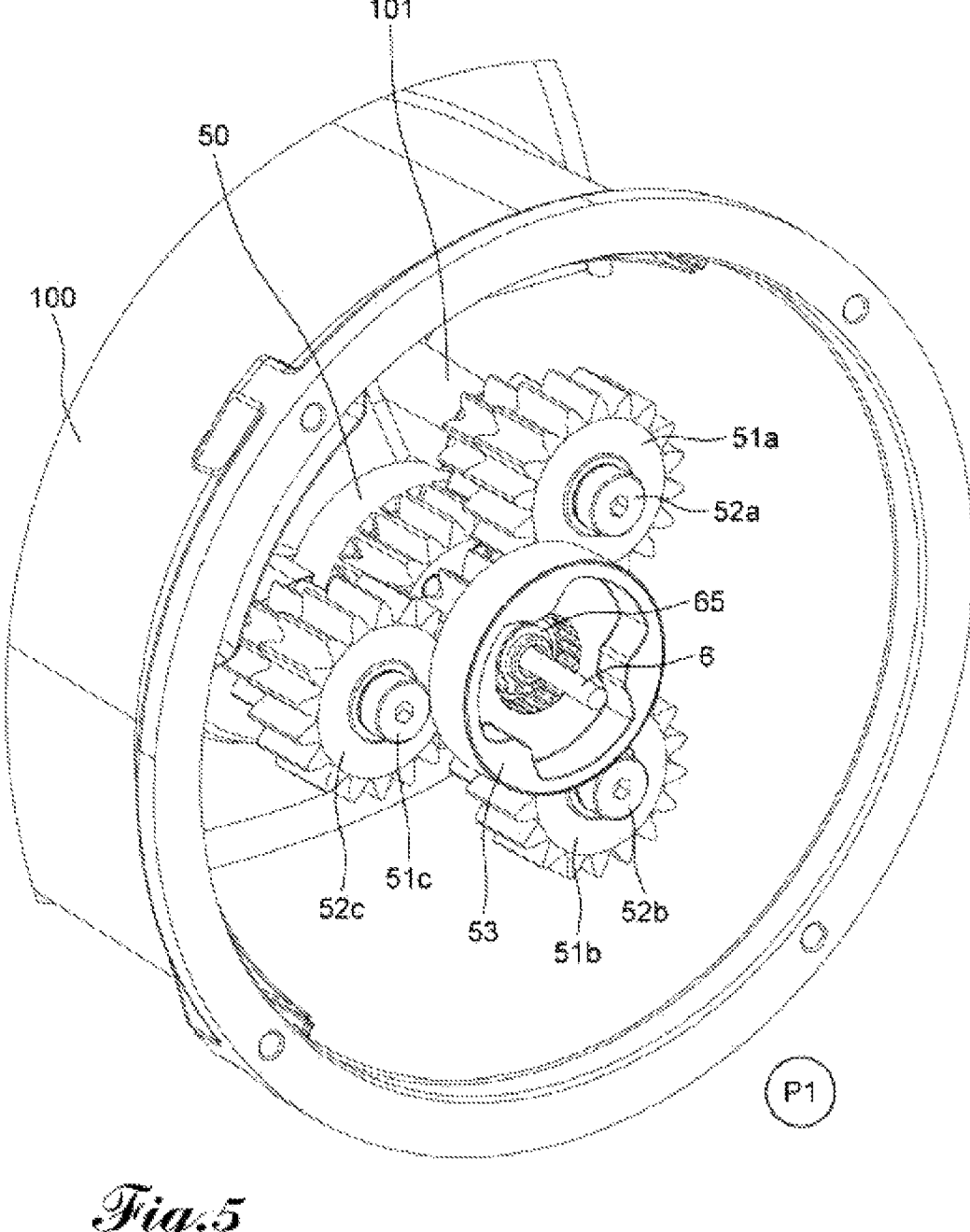
_Fig.5_

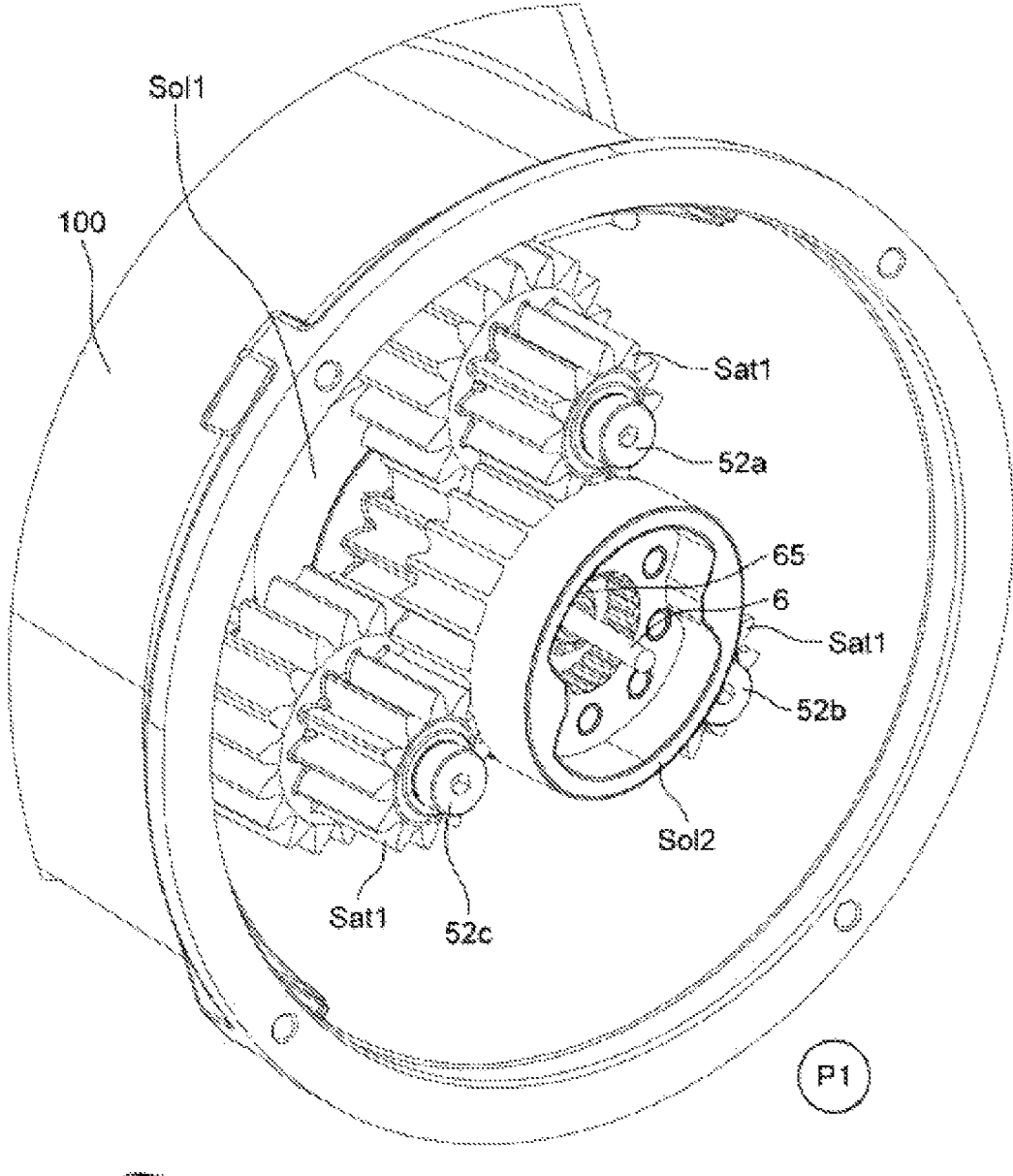
_Fig.6_

MODULAR REDUCTION GEARBOX

The invention relates to a speed reduction gear for a mechanical power transmission system used more particularly in an electrical actuator, or servomotor, for industrial valves or louver vents.

Industrial valves and louver vents are used in industries wherein fluids (liquids or gases) flow through pipes, and the circulation of the fluid is controlled by a moving member (shutter) interposed in the line and the position of which has to be controlled or even servo-controlled by an instantaneous control (variable over time, including very quickly) so as to cope with the force imposed by the fluid on the moving member.

The control of the valve or louver vent is often implemented by a mechanical member such as a wheel and worm screw; the wheel being installed on a control member of the valve or louver vent (shafts transmitting power) and the worm screw being coupled to the shaft of a rotary electric motor. The worm screw and the associated wheel make it possible to predict the irreversibility of the power transmission, since the design thereof, by adapting the screw pitch, serves to guarantee that the valve or louver vent will not return any force to the motor.

The space available is very small, hence the servomotor cannot be bulky. In addition, we are particularly interested in situations where the torque to be applied is high, because the valve or louver vent concerned is placed in a fluid line under high pressure or with a high flow-rate.

A reduction gear bringing in a gear ratio to be chosen depending on the circumstances (according, in particular, to the valve on which the servomotor is installed) can be inserted between the electric motor and the worm screw.

A sensor tracks the position of the shutter member, to know, at each moment, to what extent same shuts off the flow, and to redefine the control depending on such information.

Such a servomotor can be mounted on a valve in the energy sector, in particular in nuclear power plants, or in the water sector, in the sector of industry such as cement plants, or further in the oil and gas industry sector. Other industries use such systems as well.

The invention applies to multi-turn, or quarter-turn or more generally fraction-turn servomotors and to other types of electric actuators. The servomotor can be used in different contexts.

If the valves and industrial louver vents are thereby currently controlled by the servomotor which servo-controls the position thereof by an electronic position control computed recurrently, it is necessary to be able, with the same device, to maneuver same individually by hand, during the installation and commissioning of the electric actuator, but also whenever human intervention is needed, which can be programmed, or, in contrast, urgently in case of difficulty on the industrial site requiring manual intervention, such as, e.g., a loss of electricity supply. Thereby, a wheel for manual control is accessible on the outside of the servomotor— which is often even a regulatory requirement. Yet for the safety of personnel, the wheel should not be driven when the motor is turning the actuating mechanism. Moreover, when it is the operator who, manually, operates the actuating mechanism, it is desirable that the operator does not have to move the motor, which is then not powered and inert, which, because of friction, would be very difficult. Thereby, it is desired that the engagement of the manual control triggers a mechanical uncoupling of the motor with respect to the actuating mechanism.

In recent times, servomotors are known which include between the electric motor and one end of the worm screw; a reduction gear coupling one to the other and which can be disassembled and reassembled with a different gear ratio, by changing the gears, according to a principle of modularity (modular reduction gear). The reduction gear can in particular be an epicyclic gear train (reduction gear with three shafts, two planet gears and satellite gears), one sun gear of which is coupled directly to the worm screw, a ring gear being coupled to the motor, and a planet carrier being embedded in the casing of the servomotor. In the same system, it is known how to uncouple the motor of the worm screw from the other end of the worm screw, by a through rod in translation, which can be actuated by hand in one direction to remotely disengage the sun gear from the worm screw; a tilting stud maintaining the gear until the motor is restarted, which moves the gear away, the sun gear being brought back into engagement with the worm screw along with a movement of the control through rod.

Such system is nevertheless bulky and expensive to set up and maintain.

To overcome such difficulties, a mechanical power transmission system is proposed for controlling a valve or a louver vent, the transmission system comprising an actuating mechanism for a shaft of the valve or of the louver vent, the actuating mechanism having first and second power inputs, the system comprising a rotary motor and a rotary manual actuator coupled to the first and second power inputs, respectively, and a rod declutching mechanism exerting a thrust for declutching the motor from the first power input.

The declutching mechanism is remarkable in that same comprises a driving part and a driven part forming together a dog clutch on one axis, the driven part having a ring gear and an indentation on the driven part of the dog clutch, and being coupled to the first input by said ring gear, at least one planet gear of the power transmission system and a central bore for coupling (matching the first input), e.g. a splined bore, said driven piece having a central bore (e.g. a splined bore matching said first input), the rod going through the two central bores and pushing a hub of the driving part, so as to perform a declutching.

With such definition, the driven part, the sun gear and the planet gear(s) can be reversed and swapped so as to modify the gear ratio between the rotary motor and the actuating mechanism. It is easy for the through bore to be in the center of a first part which is a drive part such as a planet carrier or a sun gear, but which also bears an indentation of a second driven part of a dog clutch to be used as a substitute when operators want to perform the reversal.

The reversal is performed by taking advantage of the fact that the first driven part of the dog clutch can bear the shapes of a second drive part, in addition to the shape of driven part of the clutch, and thus also have the shape of a planet carrier (equipped with the planet gears thereof) or of a sun gear, to be used as a substitute when operators want to perform the reversal.

The substitution leads to a change of gear ratio, which is very advantageous: the machine just needs to be opened, parts to be swapped without bringing other parts, and to close, and a new reduction is obtained.

Depending on optional and advantageous features:

the first input and the ring gear of the driven part are coupled by one or a plurality of stepped planet gears attached to the casing and a sun gear coupled to the first input or alternatively, in another embodiment, the first input and the ring gear of the driven part are coupled by a planet carrier coupled to the first input and carrying one or more planet gears meshing with a ring gear of the casing:

the actuating mechanism can comprise a worm screw in a casing, and a manual control, accessible to an operator at one end of the worm screw opposite the motor, acting on the declutching mechanism to decouple the actuating mechanism and the rotary motor by the action of the rod, the rod being inserted into a central bore of the worm screw:

a spring blade can be positioned [in] a motor casing to keep the driving part away from the driven part when the motor is motionless, a compression spring pressed on the motor, returning the driving part against the driven part, and teeth on the driving part for moving the spring blade away under the effect of the compression spring and of the rotation of the motor when the motor is started: as an alternative to the spring blade, a pivoting lever can be used for this function:

the driven part, the driving part and the indentation of the driven part can comprise two tenons, or three tenons, possibly with a stage of three half-tenons (tenons less raised than the complete tenons). More particularly, the leading part comprises six tenons (three half-tenons and three full tenons) and the indentation of the driving part comprises three tenon indentations:

the driven part and the driving part are made of sintered metal: it is an effective method for obtaining a part that has on one side a dog clutch shape, and on the other a sprocket shape:

the manual actuator in rotation can be a wheel, a control of the transmission system serving to uncouple said wheel with the first power input by means of the rod which is pushed by the hub when the dog clutch is closed.

The invention will now be discussed in relation to the figures presented as an illustration.

FIG. 5 is another three-quarter view of the modular reduction gear.

FIG. 6 shows the same three-quarter view of the modular reduction gear but in another configuration of the latter (the gears having been disassembled and reassembled differently).

Figure 1:
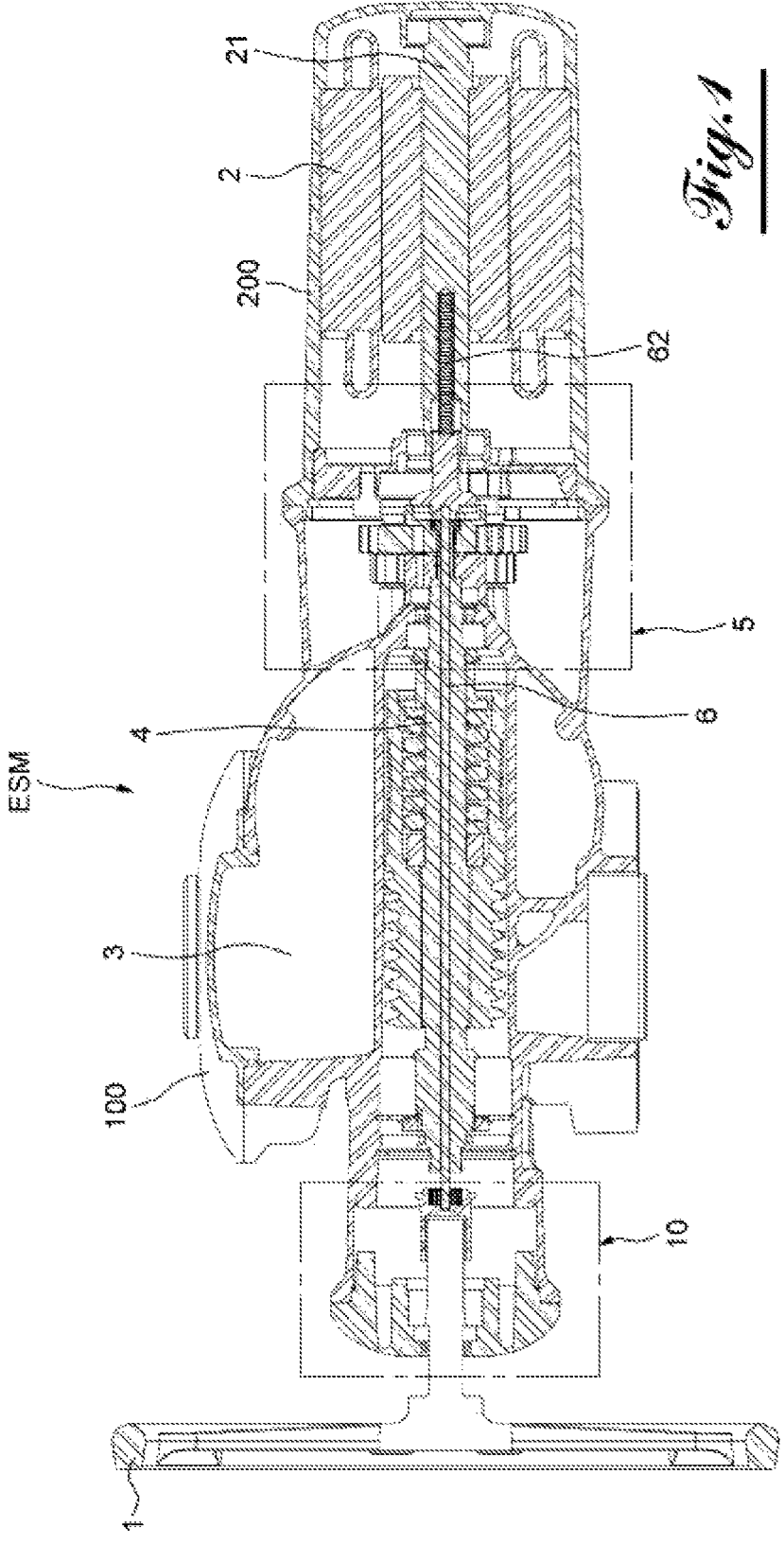
FIG. 1 represents a servomotor integrating the invention.

FIG. 1 shows a general view of a servomotor assembly ESM according to the invention, protected by and inserted into a main casing 100—the ESM servomotor assembly comprising in particular, a central worm screw in the mechanism and placed in the main casing 100—and a second casing, the motor casing 200, on the right-hand side of the figure.

The servomotor assembly ESM comprises a wheel 1, an electric motor 2 the rotor of which is referenced 21, a worm screw and associated wheel assembly, of which the wheel 3 can be seen (behind in the view) and the worm screw 4 (in the plane of the figure), the respective ends of which are, depending on the circumstances, coupled, one occasionally, the left end in the figure, to the wheel 1, and the other, the right end in the figure, to the motor 2, in most of the service situations of the servomotor ESM.

The ESM servomotor assembly further comprises a declutching system 5 between the motor 2 and the worm screw 4 and a mechanical reduction and control assembly called a manual control 10, placed between the wheel 1 and the worm screw, pushing a through declutching actuator 6 towards the motor 2, under the thrust action of a human operator acting on the wheel 1.

The through declutching actuator 6 has the structure of a rod in translation inserted and moving in a longitudinal bore of the worm screw 4, at the end of which the rod is placed for opening the declutching system 5 when the human operator pushes on the wheel 1 so as to engage the manual actuation by the wheel, which is much easier to carry out if the motor 2 is decoupled from the worm screw 4.

The wheel 3 is set in place on a shaft of the servomotor which is coupled with the shaft of an industrial valve or louver vent (not shown). Depending on the orientation of the shaft of the valve or of the louver vent, the orientation of the servomotor assembly ESM, seen as the axis common to the electric motor 2 and to the wheel 1 as well as to the worm screw 4, can be either horizontal or vertical.

As mentioned, the wheel 1 and the electric motor 2 are placed coaxially with the worm screw 4 and coupled or can be coupled with one and the other, respectively, of the two ends thereof. The declutching system 5 is apt to uncouple the electric motor 2 from the first end (on the right-hand in the figure) of the worm screw 4 or to couple same and the manual control 10 is apt to perform a change of gear ratio between the wheel I and the worm screw 4 or else to uncouple the two elements, and reversibly couple same again, on the side of the second end of the worm screw (on the left-hand in the figure).

The through actuator 6 is a purely mechanical system, in the embodiment shown, configured to transmit a change of configuration from the declutching system 5 to the manual control 10 or vice versa from the manual control 10 to the declutching system 5. The through-actuator does not transmit any mechanical power but is used for switching from one configuration of the declutching system 5 to another or from a configuration of the manual control 10 to another, respectively under the control of a signal (a thrust) coming from the other end of the worm screw 4. The through-actuator 6 is constructed in particular on the basis of an actuating rod inserted into a through bore of the worm screw 4. The actuating rod comes out at the two ends of the worm screw 4 and transmits, by the axial translation (i.e. longitudinal translation) thereof to the left or the axial translation thereof to the right, a control (a thrust) which causes a switch at one end or the other of the worm screw 4.

With regard to the above, the switching over performed by the through-actuator 6 will now be specified.

When the electric motor 2, initially stopped and uncoupled from the worm screw 4, moves under the action of a motor control, often received by a remote means of communication, the electric motor 2 is coupled to the worm screw 4 by the declutching system 5 and a coupling spring of the motor 62. The spring for coupling the motor 62 serves to release a blocking element (a spring blade which will be presented thereafter), so that the coupling takes place, because of the start of the rotation. The spring pushes the actuating rod of the through-actuator 6 towards the power transmission module 10, and via the end of the rod causes the uncoupling of the wheel 1 from the worm screw 4. Thereby, when the motor is running, the wheel is uncoupled, which is useful in order to prevent injury to an operator who would be in the vicinity of the wheel.

In contrast, when the wheel 1 is pushed by an operator so as to push in the shaft thereof towards the worm screw 4, the electric motor 2 is uncoupled from the worm screw 4 by the declutching system 5 because the latter is opened by the end of the actuating rod, the displacement of which is caused by a thrust driven by the shaft of the wheel 1. At the same time, the worm screw 4 is coupled to the wheel. Thereby, if the operator wants to use the wheel, the operator can do so without having to turn the motor, which is difficult because of friction.

Figure 2:
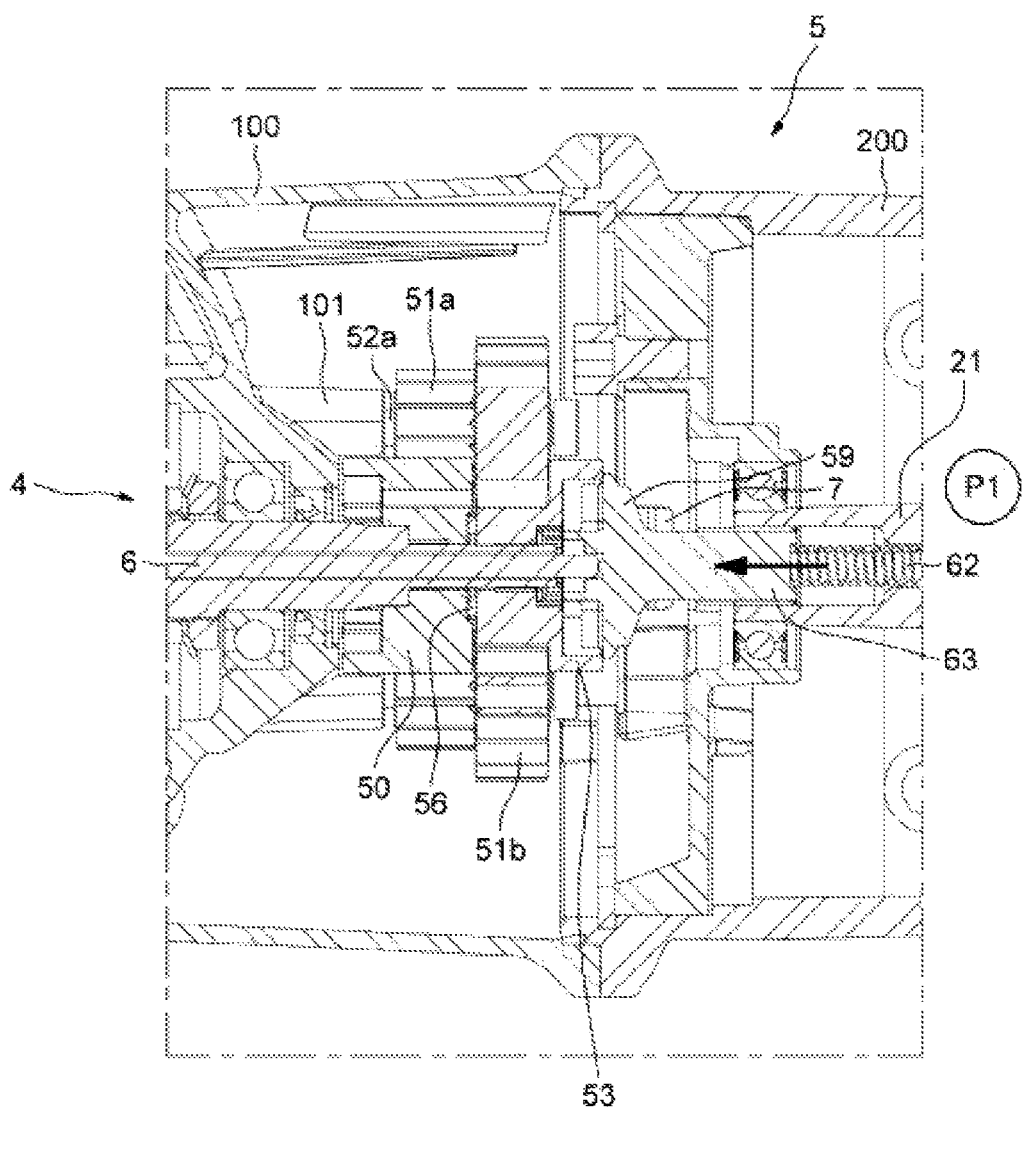
FIG. 2 shows a sectional view of the modular reduction gear in a particular configuration (defining a particular gear ratio), the motor being coupled to the worm screw, i.e. the reduction gear is in the closed position (P1).

In FIG. 2, the detail elements of the declutching system 5 have been shown. On the left of the figure is the through-actuator 6 with the actuating rod movable in longitudinal translation from left to right and from right to left. Opposite the actuating rod is the coupling spring of the motor 62 which bears on a sliding shaft 63. The sliding shaft 63 slides in a blind bore of the rotor of the electric motor 21, at the bottom of which is placed the coupling spring of the motor 62. The sliding shaft 63 has at the end thereof opposite the coupling spring of the motor 62, a shape for receiving the end of the actuating rod. Thereby, when the actuating rod is moved to the right, same pushes the sliding shaft 63 to the right, and the latter compresses the coupling spring of the motor 62. In contrast, when the sliding shaft 63 moves to the left, the coupling spring of the motor 62 is decompressed (which is what in general causes the shaft to move to the left) and the actuating rod moves to the left, by pushing the sliding shaft 63.

The declutching system 5 further comprises a sliding gear 59 mounted on the shaft 63 and which can support the shape for receiving the end of the actuating rod. The actuating rod pushes the sliding gear 59 towards the electric motor and causes the sliding gear 59 to compress the spring for coupling to the motor 62.

Different ways of arranging such different elements exist, and the invention is not limited to one of the arrangements. On the figure, the sliding gear 59 and the shaft 63 are a single piece. In any event, the sliding gear forms a dog clutch driving part and has in the middle thereof, i.e. in the hub thereof, a space through which the actuating rod can open the dog clutch, by moving the driving part away from the driven part. The hub can be the shaft 63.

When the spring for coupling to the motor 62 is released, the spring pushes the sliding gear 59 in the direction opposite to the electric motor, which has the consequence of moving the actuating rod to the left, i.e. towards the wheel.

The rod of the declutching through-actuator 6 extends through two sun gears placed coaxially with each other and comprising a central bore passing through each. Given the positions thereof with respect to the motor, same are referred to hereinafter as input gear and output gear, because said gears are the input and output of a reduction gear consisting of a plurality of gears. The output gear is referenced by 50 and the input gear is referenced by 53. The reduction gear is modular, i.e. the gears can be moved or replaced or exchanged, so as to obtain a custom reduction ratio.

The modular reduction gear transmits, when the dog clutch is closed, the torque from the electric motor, on the right of the figure, to the worm screw actuating the wheel, then the servomotor shaft, the valve shaft and the valve, and the torque is first applied to the input gear 53, before reaching the output gear 50.

The torque is transmitted between the input gear 53 and the output gear 50 via, in the configuration shown in FIG. 2 of the modular reduction gear, the satellite gears 51*a* and 51*b*, a third satellite gear 51*c* not being visible in the figure, the three satellite gears being stepped, so as to mesh with one and the other of the two sun gears, the ring gears of which have different diameters. The three satellite gears are placed around the input gear 53 and the output gear 50 in a regular arrangement in an equilateral triangle. The three satellite gears 51*a* to 51*c* are each attached to the main casing 100 by screws 52*a* to 52*c* (visible in FIG. 5) extending through a respective satellite gear and attaching same to a stud 101 of the casing. There are three studs 101 on the casing, for attaching the three satellite gears. The attachment screws are parallel to the axis of the worm screw and form the axis of rotation of the satellite gears, parallel to the axis of rotation of the input and output gears, which are, as already mentioned, sun gears.

The input gear 53 and the output gear 50 bear on each other longitudinally by means of a thrust needle bearing 56. The thrust needle bearing 56 has a take-up role for axial forces. Same is placed between a transverse face of one of the two gears and a transverse face of the other of the two gears.

The torque is transmitted from the electric motor via the rotor 21 to the shaft 63, to the sliding gear 59 and then to the input gear 53. Indeed, the sliding gear 59 is, in the position P1 shown in FIG. 2, dog clutched with the input gear 53, which has the shape of a dog clutch (this is the driven part) on one of the transverse faces thereof, matching the dog clutch shape supported by the transverse face of the sliding gear (this is the driving part). The torque is then transmitted from the input gear 53 to a first section of the planet gears which all three mesh with same, then from the satellite gears, by a second section of the satellite gears, to the output gear 50 which meshes with the three satellite gears. The meshing was made possible, naturally, by a specific choice of the diameter of the two sections of satellite gears, compatible with the diameters of the two planet gears.

Along the shaft, the output sun gear 50 has a section that bears the form of a dog clutch driven part (which is not used as long as the gear remains in the output position) and a section that bears peripheral gear teeth (a ring gear) to mesh with the satellite gears. Same also bears, at the center thereof, shapes for the fitting onto the end of the worm screw; in the present case splines on the surface of a through bore which is engaged on the end of the worm screw, which forms a supplementary splined shaft.

Along the shaft, the input sun gear 53 has a section that has peripheral gear teeth (a ring gear) to mesh with the satellite gears and a section that bears the shape of a dog clutch driven part. Same also has, at the center thereof, shapes for the fitting onto, if appropriate, the end of the worm screw; in the present case splines on the surface of a through bore which could be engaged on the end of the worm screw; in the event of a reconfiguration of the reduction gear, along with a reversal of the output sun gear 50 and the of input sun gear 53.

It is clear from the descriptions of the two gears, that the gears can be reversed: the output gear can be placed at the input, in which case the form thereof of dog clutch driven part will be used, but the splined bore thereof will not be reversed, and vice versa, the input gear can be placed as output, in which case the dog clutch driven part shape thereof will not be used, and the splined bore thereof will be used. To ensure the continuity of the power transmission, the satellite gears are turned over and screwed in the same way as before.

Figure 3:
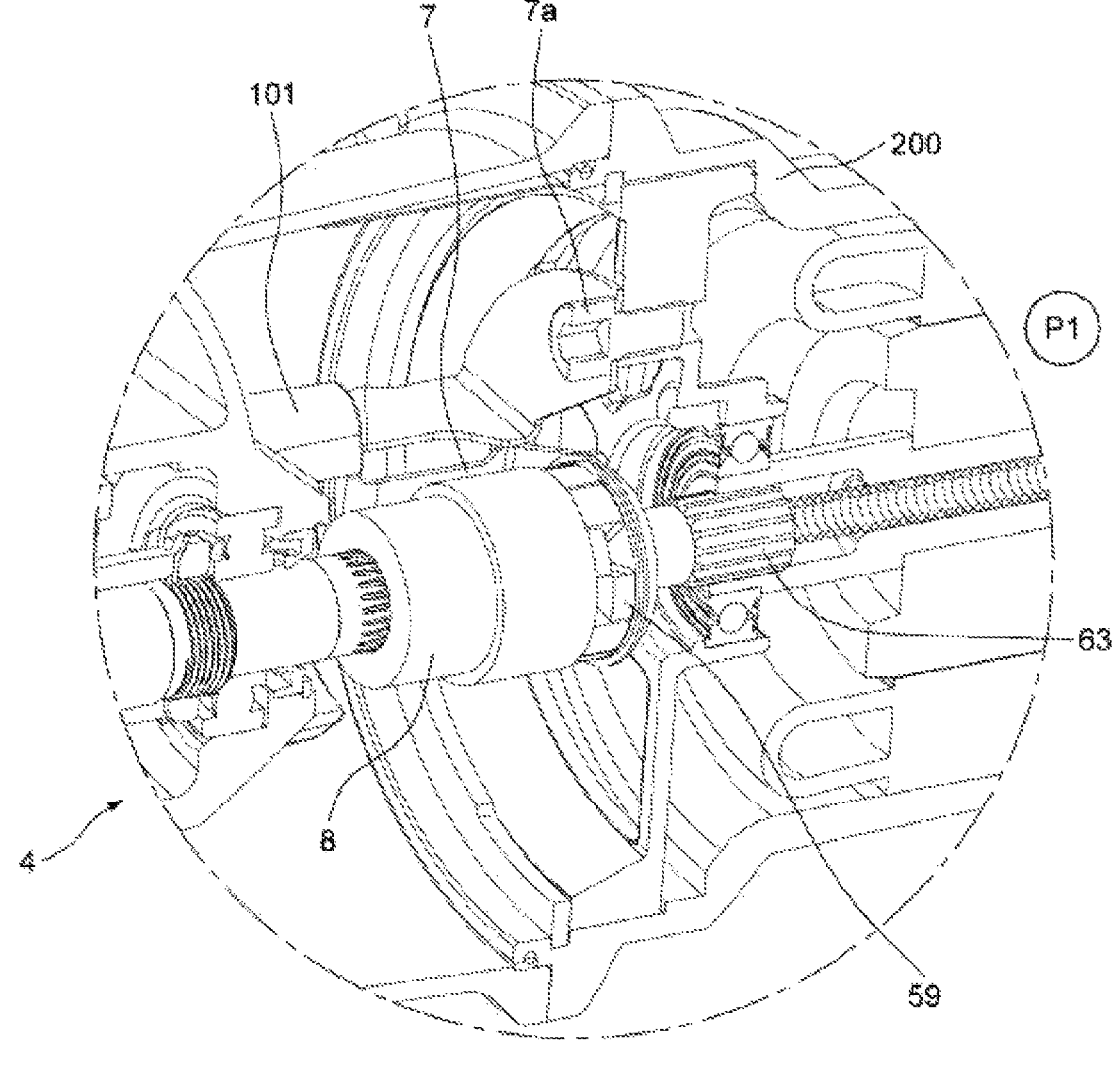
FIG. 3 shows a three-quarter view of a mode of use of a servomotor without the modular reduction gear.

FIG. 3 shows the system of FIG. 2, without reduction between the electric motor and the worm screw. Thereby, an attachment stud 101 is visible on the left of the figure, near the through-actuator 6, which is not used, because the satellite gears have not been inserted.

The right-hand part of the figure shows the shaft 63 and the sliding gear 59, which is dog clutched with an extension 8 coupled by splines to the worm screw 4. Indeed, the worm screw has splines on the circumference of the end thereof, and the extension piece 8 comprises a splined bore matching the splines.

The figure also shows the blade spring 7 which is screwed by screws 7a to the casing of the electric motor 200 and has the role of locking the dog clutch in the open position, with the motor switched off, as will be commented on hereinafter.

Alternatively, in a variant (not shown), the output gear 50 shown in FIG. 2 is kept and directly coupled in rotation, in said configuration, with the input gear 53 also kept, by a means of coupling placed on the axis of rotation and fitted onto one and the other, the satellite gears being removed. Such notions are shown again later in FIG. 11.

Figure 4:
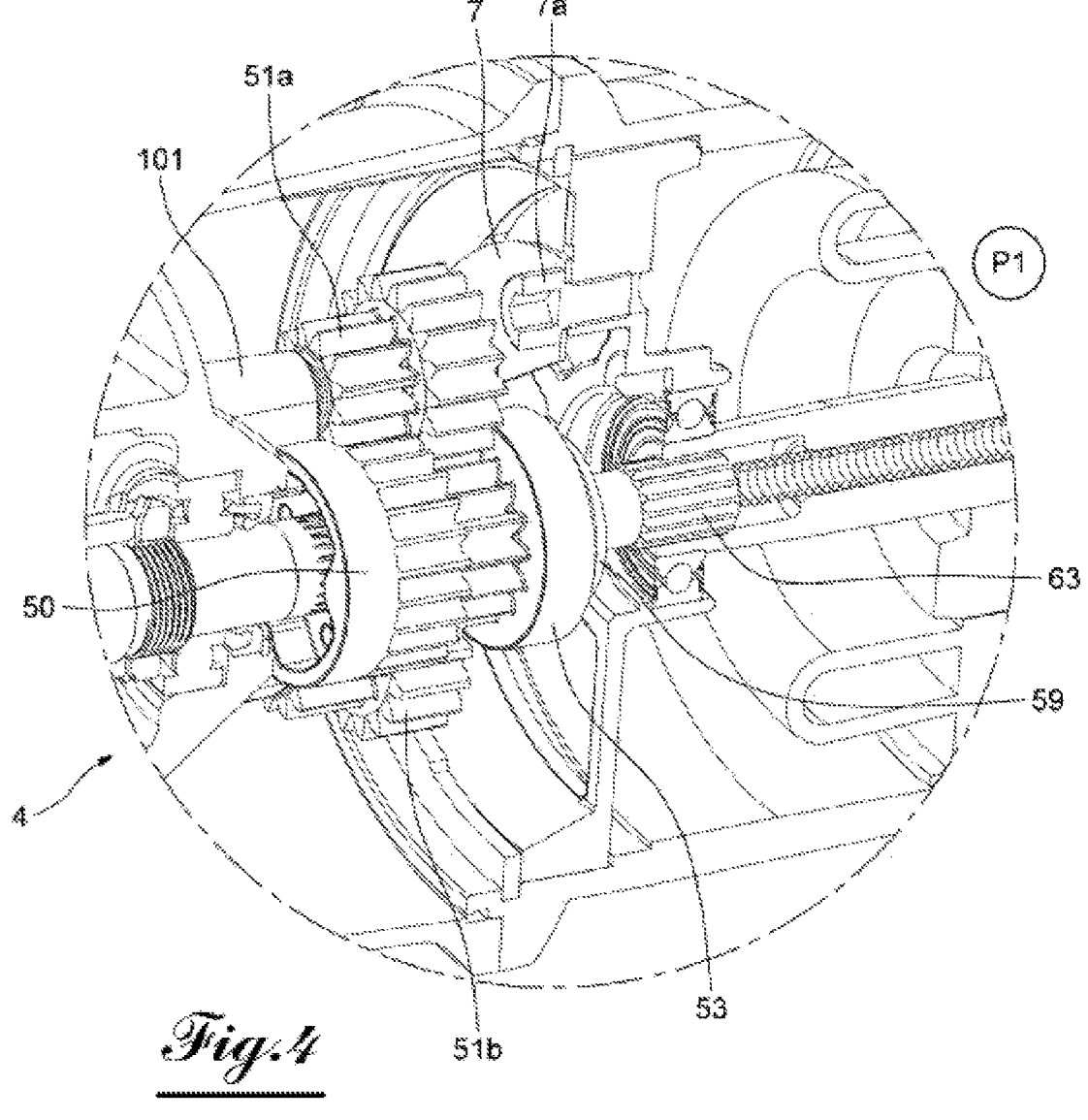
FIG. 4 shows a three-quarter view of the modular reduction gear in a given configuration, other configurations being additionally accessible.

FIG. 4 in FIG. 4, the modular reduction gear is found at the same angle as in FIG. 3, this time with the satellite gears 51a, 51b and 51c transmitting the torque from the input gear 53 to the output gear 50, the output gear being coupled by splines to the worm screw. Indeed, the output gear 50 has a splined bore which is engaged on the outer splined cylinder of the worm screw: The output gear 50 is not directly coupled in rotation, in said configuration, with the input gear 53, since the means of coupling previously placed on the axis of rotation was removed.

In the present view, the sliding gear 59 is dog clutched to the input gear 53, which defines the position P1 of the clutch system of the electric motor: the electric motor is coupled to the worm screw.

It can be seen in said figure that the outside diameter of the cross-section of the satellite gears 51a to 51c which mesh with the output gear 50 is smaller than the diameter of the cross-section of the satellite gears which mesh with the input gear 53. The diameter of the output gear is larger than the diameter of the input gear. It concerns the configuration that has already been observed in FIG. 2. The configuration defines a given reduction ratio between the electric motor and the worm screw: Depending on the valve or louver vent to be controlled, it is necessary to modify said ratio.

FIG. 5 shows the modular gear of the clutch release system 5 in a three-quarter view from another angle, from the motor space, looking into the main casing 100 (the casing of the worm screw). And this time the sliding gear is not shown, in order to avoid overloading the image, which makes it possible to see the inside of the input gear 53, which bears a shape of a dog clutch driven part. The splined bore of the input gear can also be seen, which is only used in case of reorganization of the gears, if the gear in question is placed at the output. The end of the actuating rod can also be seen which protrudes from the center of the input gear 53 and which is held by an axial retaining snap ring 65. The actuating rod of the declutching through-actuator 6 extends through the input gear and the output gear, through the bores thereof, until coming into contact with the driving part of the dog clutch (not shown in the figure), which has a surface to be pushed by the rod.

FIG. 6 is a view similar to the view of FIG. 5, with nevertheless a different form of dog clutching of the input gear 53 (the driven part). Indeed, there are not three tenons and three mortises in the form of a dog clutch (like in the embodiment shown in FIG. 5) but only two tenons and two mortises, such feature not being essential for the implementation of the invention. In addition, and independently of such difference, the gear set is not the same. Satellite gears Sat1 are stepped gears having two toothed rings arranged successively on the axis thereof, one of which has a large diameter meshing with the (sun) gear Sol1 (placed at the output), and a small diameter meshing with the sun gear Sol2 (gear placed at the input), whereas the opposite was shown in the assembly shown in FIG. 5. The diameters of the toothed wheels of the input and output gears are of course suitable for meshing with the corresponding sections of the satellite gears: the ring gear of Sol2 is larger than the ring gear of Sol1, whereas the opposite was shown in FIG. 5.

Figure 7:
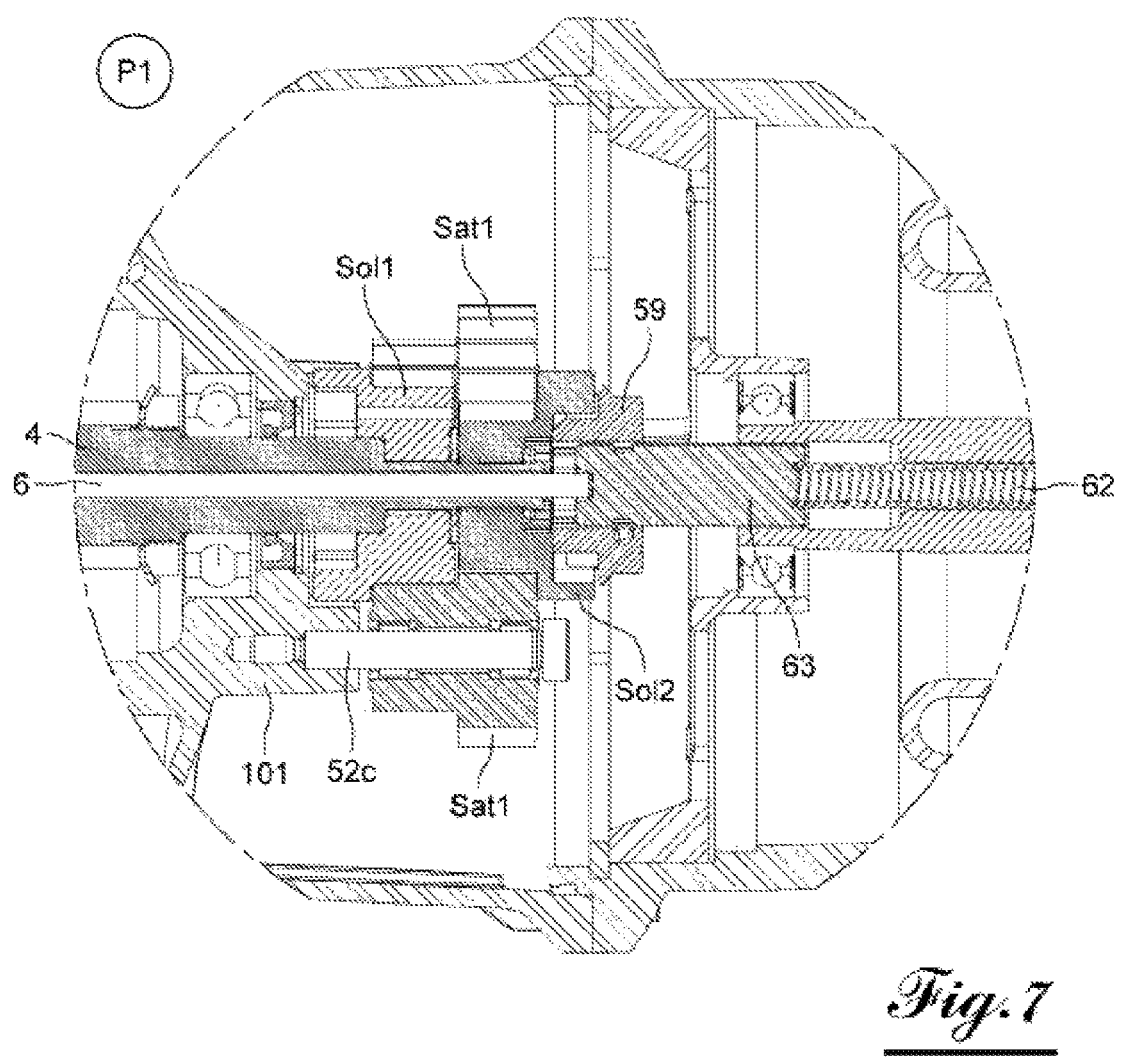
FIG. 7 shows the configuration of FIG. 6 but in a sectional view.

FIG. 7 shows the assembly of FIG. 6 in cross-section view. It appears in particular that the meshing diameter of the gear Sol1 is smaller than the meshing diameter of the gear Sol2, as has just been said.

Figure 8:
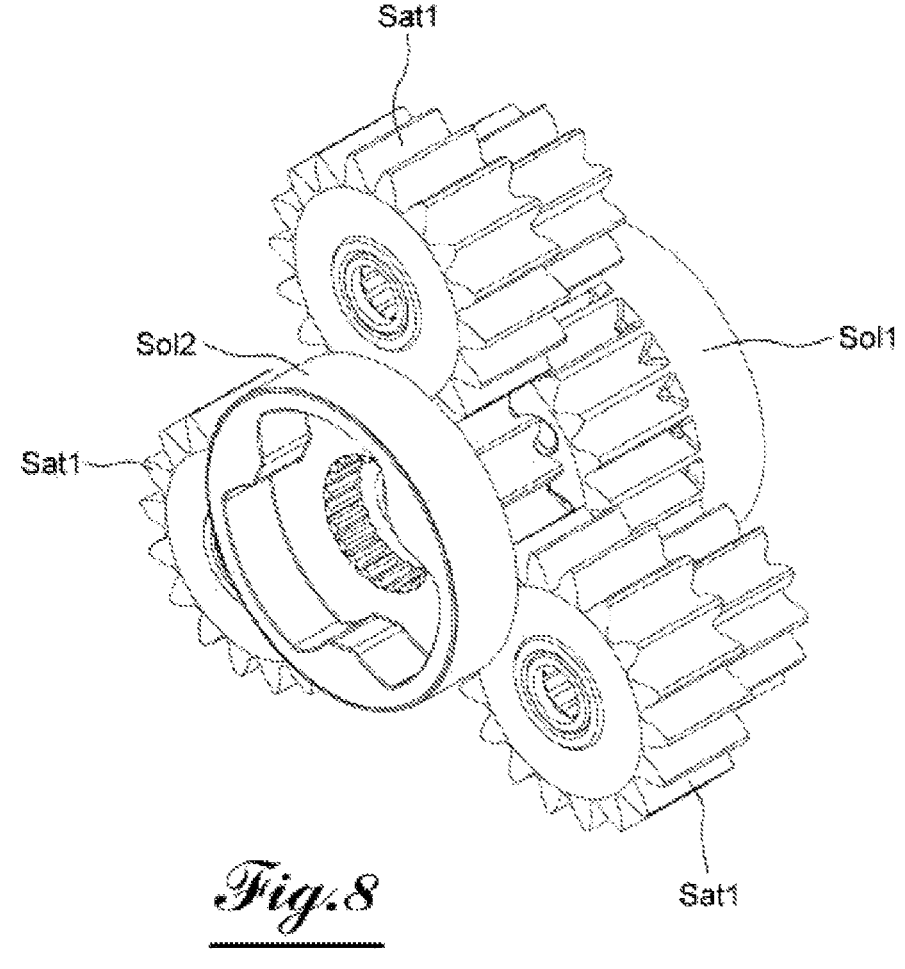
FIG. 8 shows another configuration of the modular reduction gear in a three-quarter view (similar to the configuration shown in FIG. 4).

FIG. 8 Said assembly is also shown in FIG. 8, which is a three-quarter view in which only the gears are shown (a dog clutch shape with three tenons and three mortises is shown, such point being independent of the other features).

Figure 9:
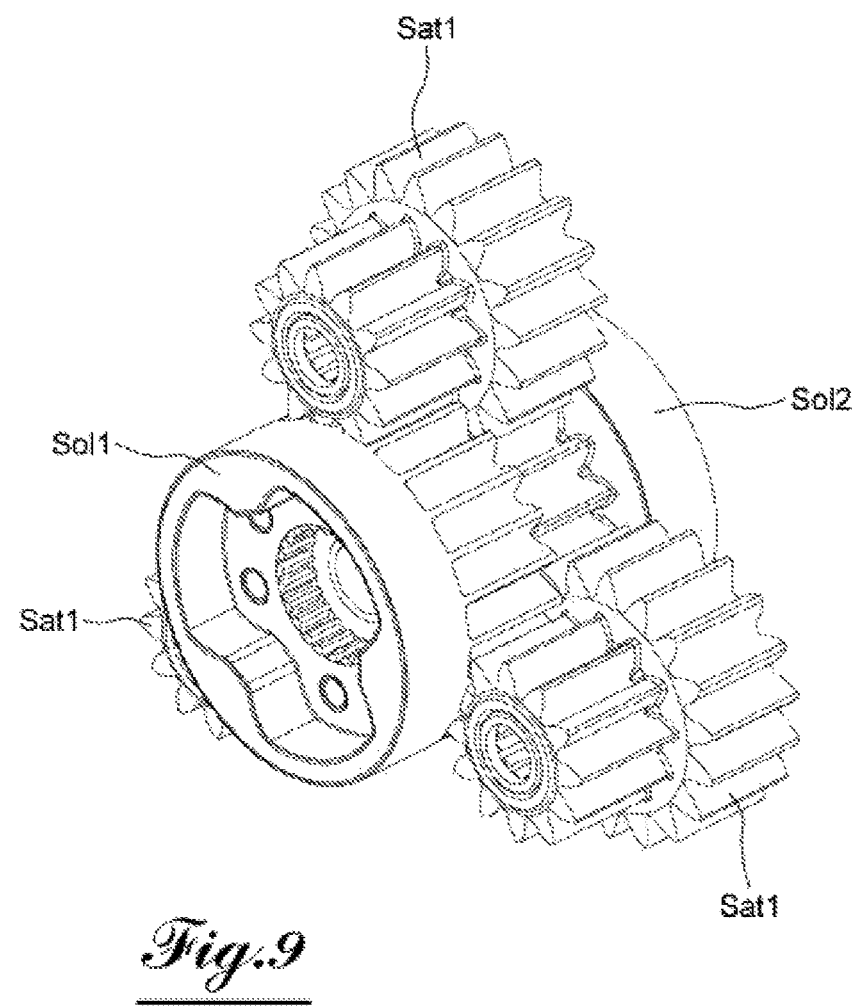
FIG. 9 shows in a three-quarter view the configuration of FIGS. 6 and 7.

FIG. 9 shows the same parts but this reversed, with the gear Sol1 placed at the input and the gear Sol2 placed at the output. The satellites Sat1 are retained but mounted in the opposite direction. The gear ratio is the reverse of the gear ratio obtained with the previous assembly.

The dog clutching shapes of Sol1 and Sol2 are identical, so that one or the other can be used in cooperation with the sliding gear, which was said to form the other part of the coupling, i.e. the driving part. Like hereinabove, the dog clutch shape is surrounded by a circumference the external diameter of which has no teeth, and which has the same external diameter as the top of the teeth, which provides a longitudinal stop to the teeth of the satellite gears.

Figure 10:
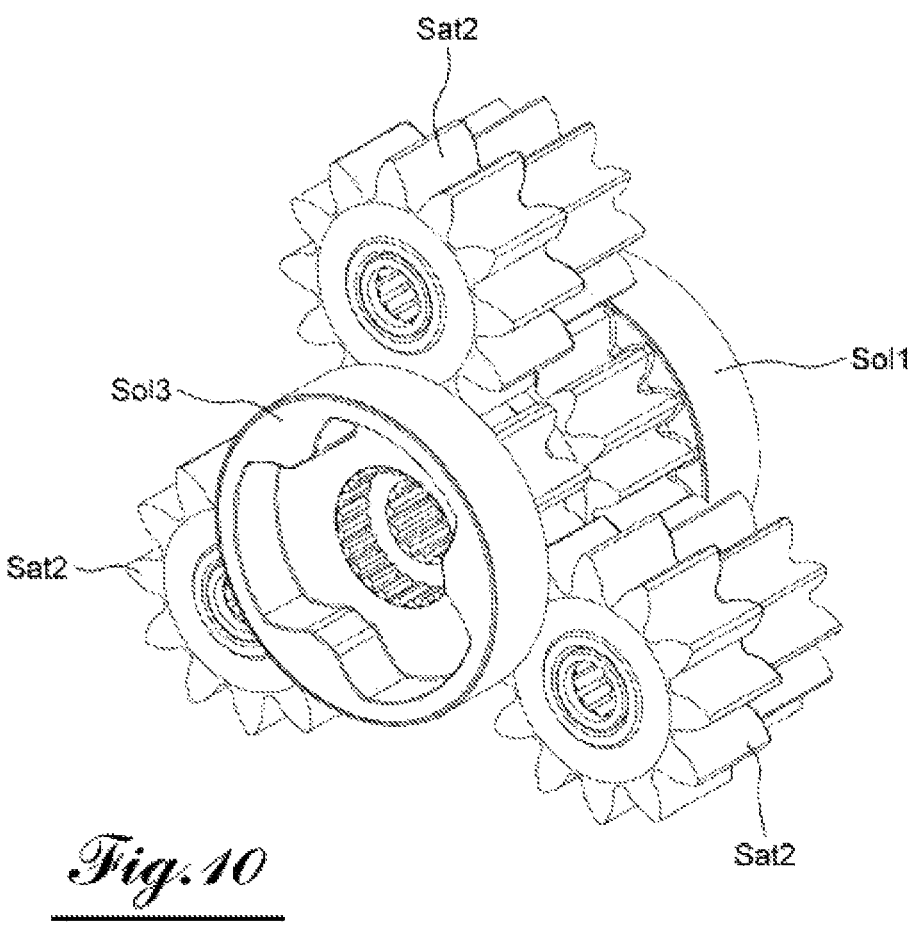
FIG. 10 shows another implementation of the modular reduction gear, with a third sun gear.

FIG. 10 shows, at the same angle as FIGS. 8 and 9, an assembly with the gear Sol1, a new gear Sol3 and satellite gears different from the previous satellite gears, referenced by Sat2. Such assembly leads to obtaining a reduction ratio different from the two previous assemblies, in the context of the modularity of the reduction gear.

Figure 11:
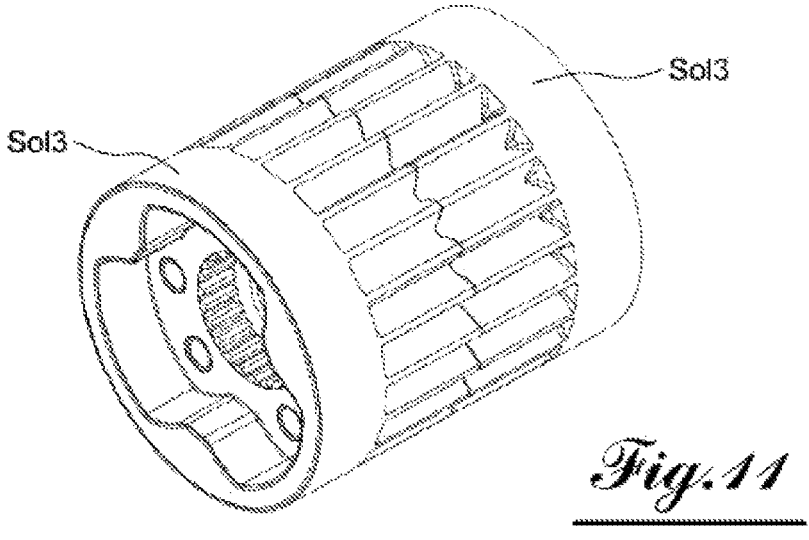
FIG. 11 shows a last implementation of the modular reduction gear, without reduction.

FIG. 11 shows an assembly without satellites with direct transmission between two examples of the gear Sol3 which are coupled to each other by a central key (not visible). Thereby, in such configuration, the toothed wheels of the two gears do not serve, the torque is on the other hand transmitted by the key which is inserted into the internal splined bores of the two examples of the gear Sol3. Functions similar to the functions of FIG. 3 is obtained.

Figure 12:
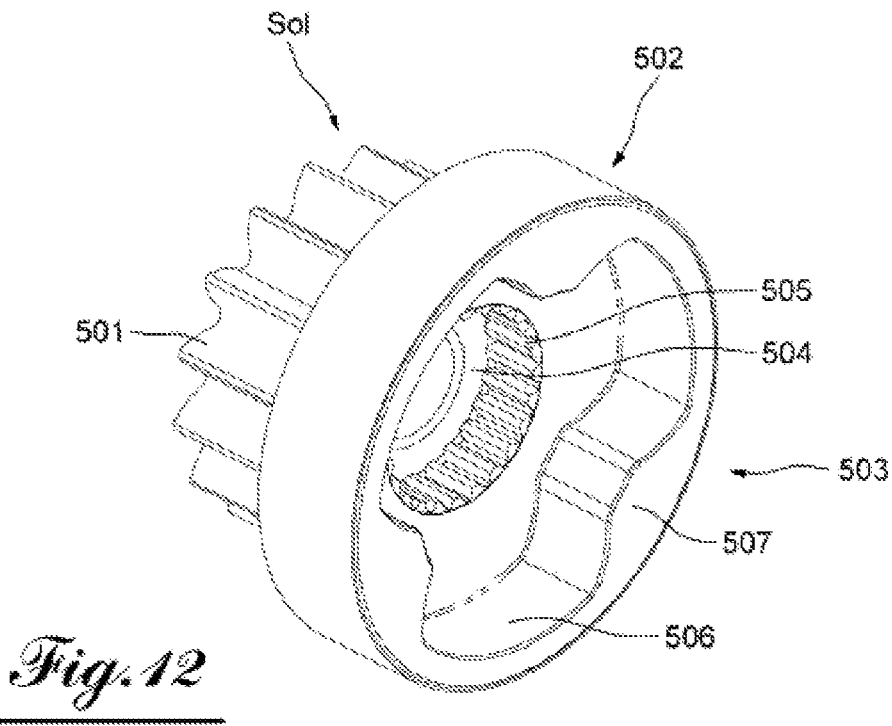
FIG. 12 shows an example of a sun gear of an embodiment of the invention, seen in detail.

FIG. 12 shows the structure of a sun gear Sol which can be put in place either in front of the sliding gear for engaging the latter by dog clutching and reversibly couple the motor to the worm screw by serving as input gear for the reduction gear, or by engaging splines 505 on the worm screw, so as to serve as the output gear of the reduction gear. The sun gear Sol comprises, externally, two sections along the shaft: a section with teeth 501 forming the ring, and a smooth external section, referred to here as a dog clutching section 502. The coupling section 502 comprises a cavity 503 open for access by longitudinal translation, the lateral walls delimiting the cavity 503 being parallel to the longitudinal axis of the sun gear Sol so as to permit the engagement of the driving part. It thereby concerns a female part of a dog clutch, the female part having a single stage. Moreover, the cavity 503 has a bottom which is a plane wall 504 perpendicular to the longitudinal axis of the gear. At the center of the plane wall 504, a large cylindrical bore 505 with a general geometry of revolution and splined is present in the sun gear Sol. The splined bore 505 as such has a bottom which is pierced at the center thereof by a bore of smaller diameter passing through the toothed wheel 501 right to the face opposite the cavity 503 and coming out at the center of the teeth 501. Such narrowest through bore is used for letting through the actuating rod. The splines on the larger bore serve to engage supplementary splines on the worm screw, in assembly configurations where said gear does not serve the dog clutching but serves as output gear of the reduction gear.

The cavity 503 consists of three mortises 506 separated by wide tenons 507, but another configuration is possible to form the dog clutch driven part.

Figure 13:
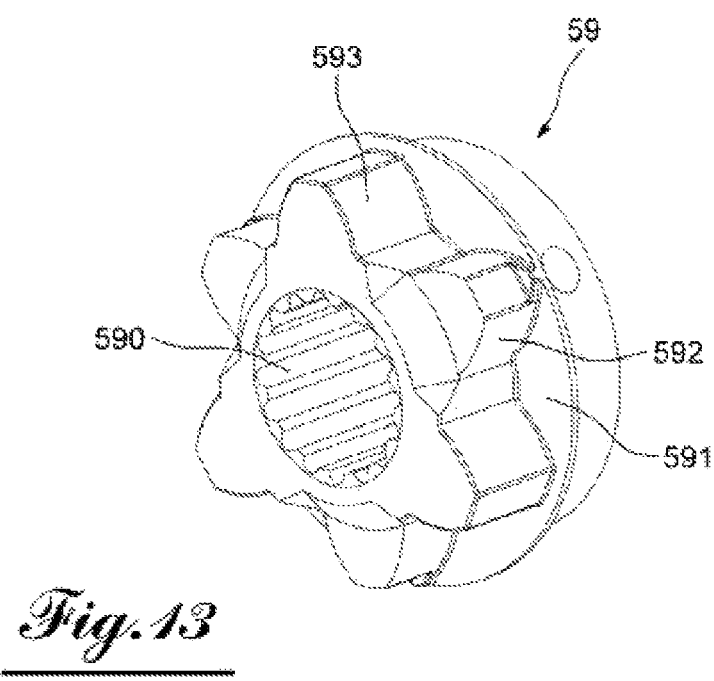
FIG. 13 shows in detail a part already seen in FIG. 2, which is a sliding gear (half-dog clutch).

FIG. 13 The structure of the sliding sleeve 59, which is a dog clutch driving part, will now be described with reference to FIG. 13. The sliding gear 59 comprises, along the longitudinal axis, a section of large diameter, at the rear in the figure, and a narrower section with complex shapes, at the front in the figure.

Protruding from a plane surface 591 orthogonal to the longitudinal axis, said surface forms a shoulder of the rear wide section, tenons of intermediate height 592 and tenons of higher height 593. The tenons are arranged regularly around the longitudinal axis of the sliding rod 59, alternating intermediate height tenons 592 and higher height tenons 593. There are three intermediate height tenons and there are also three higher height tenons. The male part of the dog clutch, or driving part, is thereby two-staged.

The sliding gear 59 comprises a splined through-bore 590. Same is used for engaging the sliding shaft 63, which has surface splines on the outer surface thereof. However, another solution can be implemented, such point not being essential. The actuating rod is apt to push the sliding rod 59 by resting at the center thereof, either because the sliding shaft forms a support for the sliding rod (e.g. because of a keying), or because the sliding gear and the shaft are in one piece as shown in FIG. 2.

Figure 14:
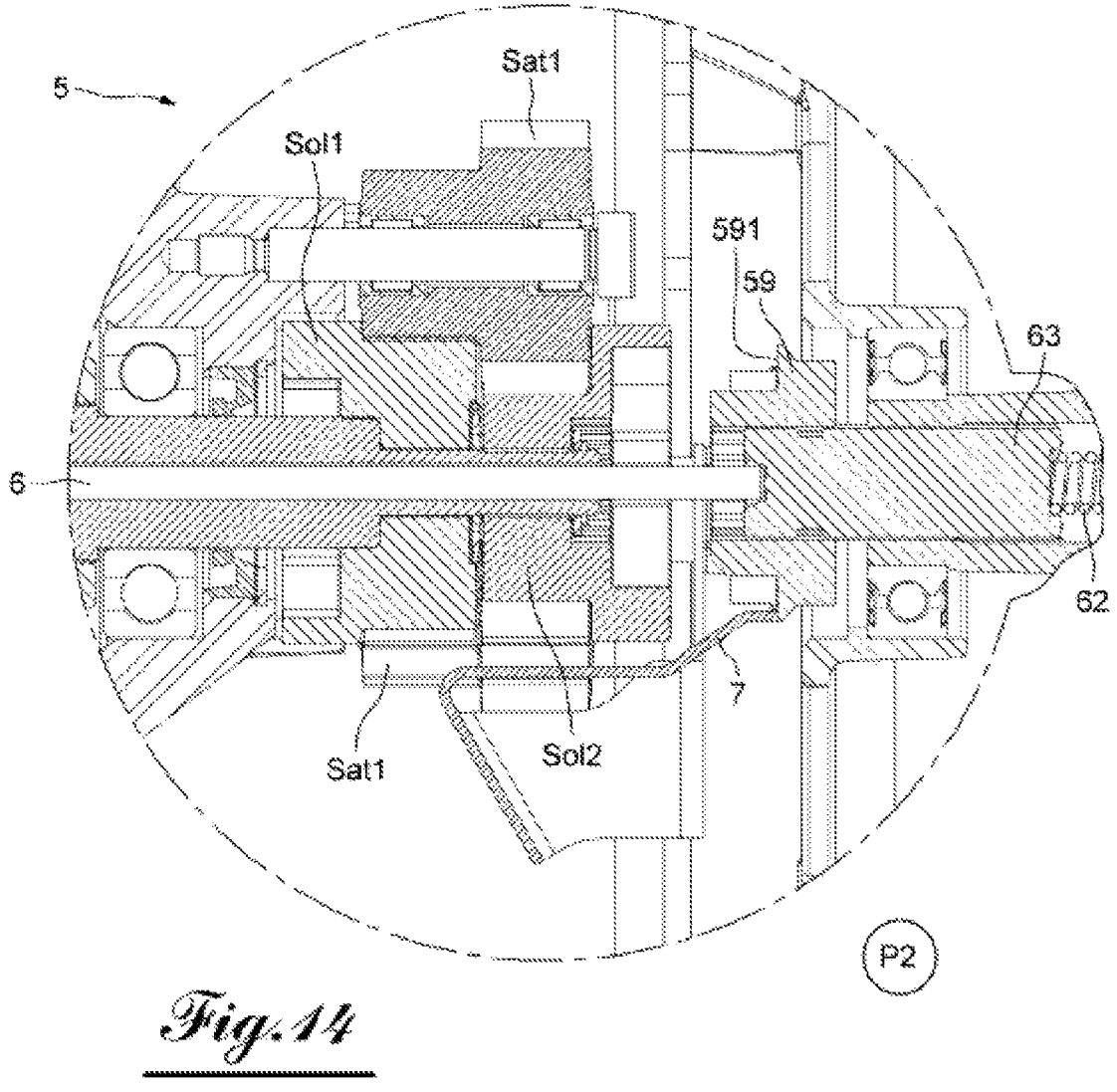
FIG. 14 shows the reduction gear in the position with the dog clutch open and the manual control engaged, the motor being decoupled from the worm screw. The above is a second position (P2) of the system already presented in a first position shown in FIG. 2.

FIG. 14 shows the second position P2 of the declutching system 5. The actuating rod has progressed to the right and the end thereof is inserted more than before towards the shaft 63. The progression of the actuating rod is accompanied by a translation of the sliding gear 59 towards the electric motor, and the compression of the spring for coupling to the motor 62. Moreover, during the translation of the sliding gear 59, the blade spring 7 has been moved outwards, radially, by the rear section of the latter which has an essentially conical circumference followed by a shoulder, and the blade spring having first been tensioned, then, having passed the shoulder and extends relaxed, rests at the end of the movement on the shoulder, which prevents a backward return of the sliding gear 59 despite the pressure applied thereto by the coupling spring of the motor 62. Thereby, even if the pressure on the actuating rod is released, the sliding gear 59 stays in the position visible in the figure.

The sliding gear 59 is no longer coupled to the sun gear Sol2, because the latter has not followed the translational movement (it concerns a dog clutch opening) and is thus now moved away from the sliding gear 59. Indeed, the actuating rod translates without friction in the bores of the input gear and of the output gear of the reduction gear.

If the electric motor starts to rotate, under the effect of an electrical command sent thereto, the rotation of the shaft 63 induces the rotation of the tenons supported by the sliding gear 59, which push the blade spring 7 sideways, causing the latter to tension and to leave the shoulder of the sliding gear 59, freeing the latter in translation along the axis. The sliding gear 59 pushed by the connecting spring of the motor 62 will move closer to the sun gear Sol2 and regain the engagement thereof with the dog clutch shape of the latter, thereby coupling the motor again with the worm screw.

By making such travel to the left, the sliding gear 59 pushes the actuating rod also to the left so that the rod is less pushed towards the shaft 63. The actuating rod thus progresses in the manual control at the opposite end of the worm screw; and depending on the assembly of the worm screw; can in particular uncouple the wheel from the end of the worm screw, so as to prevent the motor from rotating the wheel, which is dangerous for operators.

And the sliding gear 59 lets the spring blade 7 relax, which finds space towards the longitudinal axis as the sliding gear moves to the left, once having passed the shoulder. The above can be seen in FIG. 3.

The engagement of the sliding gear 59 with the sun gear Sol2 takes place through the insertion of the tenons of the sliding gear in the mortises of the sun gear Sol2.

By means of to the two-stage clutch system, there is no impact when changing the direction of rotation of the motor and there is no play when the system is fully engaged.

It should be pointed out that the splines of the bore of the sun gears are used only when the sun gear concerned is placed at the output of the reduction gear, mounted on the worm screw: On the other hand, when the sun gear faces the sliding gear 59, the splined bore is not used.

By means of the use of reversible gears and due to the possibility of fitting different types of gears, the modular reduction gear permits an easy fitting of different gear ratios between the electric motor and the worm screw, depending on the valve to be equipped.

Figure 15:
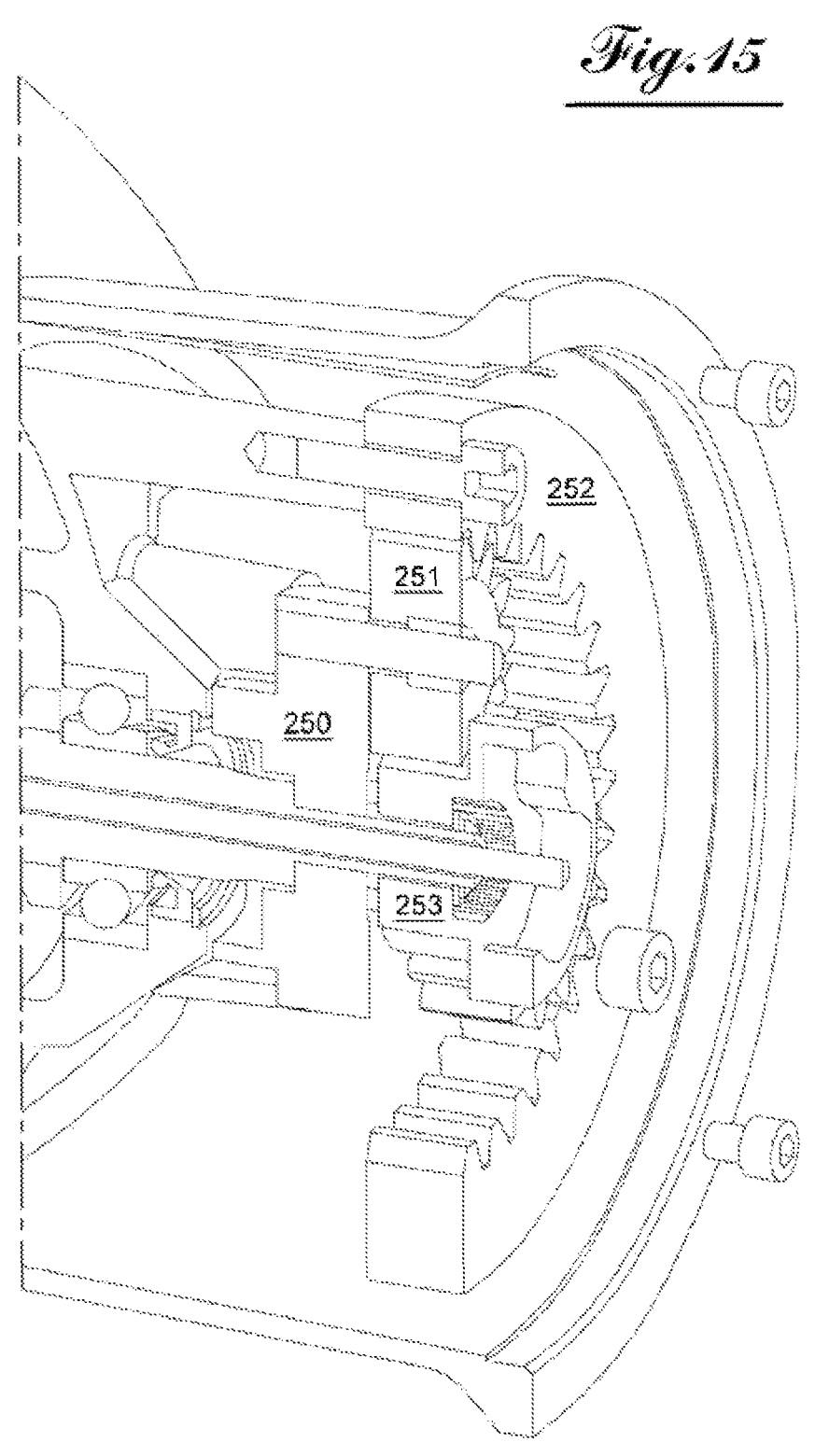
FIG. 15 represents a second embodiment of the reduction gear part of the invention.

FIG. 15 shows a second embodiment of the reduction gear. The known elements are not commented, nor numbered, in order to make the text and the drawing clearer.

Instead of transmitting torque from the motor to the worm screw by stepped gears, each having a shaft attached to the casing and meshing via a stage on the dog clutch driven part and via another stage on a sun gear of the worm screw, the sun gear is replaced by a planet carrier 250 and the planet carrier has satellite gears 251 which mesh with a ring gear 252 attached to the casing, as well as with the dog clutch driven part.

The planet carrier has the shape of the dog clutch driven part, not used in the configuration of the figure, but which can be used by swapping the position thereof with that of dog clutch driven part 253 placed opposite the dog clutch driving part (not shown) in the configuration shown in figure. Such swapping, based on the presence of identical splined bores in the axial position on the parts 253 and 250, and on the presence of identical dog clutch driven shape on the two parts, makes it possible to take advantage of two different gear ratios: the satellite gears being placed again, by a longitudinal arrangement, to mesh with the ring gear, even if the satellite gears being mounted on a planet carrier that looks in the opposite direction in the new configuration.

ESM SERVOMOTOR ASSEMBLY

1 wheel
2 electric motor
21 rotor of the electric motor
3 wheel
4 worm screw
5 declutching system
6 declutching through-actuator
50 output gear
So1, So2, So3, So1 sun gears
501 toothed wheel
502 dog clutching section
503 cavity
504 flat wall
505 splined bore
506 mortise
51a, 51b, 51c, Sat1, SatT2 stepped satellite gears (two-stage)
52a, 52b, 52c screws
53 input gear
56 needle thrust bearing
59 sliding gear
590 splined bore
591 flat surface
592 intermediate height tenons
593 higher height tenons
62 coupling spring of the motor
63 sliding shaft
65 snap ring
7 spring blade
7a attachment screw of the blade
8 extension piece
10 manual control
100 main casing
101 attachment stud
200 motor casing
P1 first position of the clutch system of the electric motor
P2 second position of the clutch system of the electric motor
250 planet carrier
251 satellite gears
252 ring gear
The invention claimed is:

1. A mechanical power transmission system for controlling a valve or a louver vent, the transmission system comprising:

an actuating mechanism for a shaft of the valve or of the louver vent, the actuating mechanism having first and second power inputs;

a rotary motor and a rotary manual actuator coupled to the first and second power inputs, respectively;

a rod declutching mechanism exerting a thrust for declutching the rotary motor from the first power input, wherein the declutching mechanism comprises a driving part and a first driven part, together forming a first dog clutch on a shaft, the driven part having a ring gear, and being coupled to the first power input by said ring gear, at least one satellite gear of the power transmission system, and a first central bore for coupling, wherein said driven part has a second central bore, wherein a rod extending through the first and second central bores is configured to push a hub of the driving part in order to perform a declutching.

2. The mechanical power transmission system according to claim 1, wherein the central bore is in the center of a first driven part, the first driven part bearing an indentation of a second driven part dog clutch, the first dog clutch corresponding to the indentation of the second driven part.

3. The mechanical power transmission system according to claim 1, wherein the first power input and the ring gear of the driven part are coupled by one or a plurality of stepped satellite gears attached to the casing and a sun gear coupled to the first power input.

4. The mechanical power transmission system according to claim 1, wherein the first power input and the ring gear of the driven part are coupled by a planet carrier coupled to the first power input and carrying one or more satellite gears meshing with a ring gear of the casing.

5. The mechanical power transmission system according to claim 1, wherein the actuating mechanism comprises a worm screw in a casing and a manual control, accessible to an operator at an end of the worm screw opposite the rotary motor, acting on the rod declutching mechanism to decouple the actuating mechanism and the rotary motor by the action of the rod, the rod being inserted into a central bore of the worm screw.

6. The mechanical power transmission system according to claim 1, wherein a blade spring or a lever keeps the driving part at a distance from the driven part when the rotary motor is motionless and a compression spring is pressed against the motor, returning the driving part against the driven part.

7. The mechanical power transmission system according to claim 1, wherein the driving part comprises six tenons and an indentation of the driving part comprises three indentations of pins.

8. The mechanical power transmission system according to claim 1, wherein the driven part and the driving part comprise sintered metal.

9. The mechanical power transmission system according to claim 1, wherein the rotary manual actuator is a wheel, and is configured such that a command from the mechanical power transmission system uncouples said wheel from the first power input by means of the rod, which is pushed by the hub when the first dog clutch is closed.

10. The mechanical power transmission system according to claim 1, wherein the first central bore for coupling is a splined bore.

* * * * *